US 8,881,712 B2

(12) United States Patent
De Almeida et al.

(10) Patent No.: US 8,881,712 B2
(45) Date of Patent: Nov. 11, 2014

(54) EXHAUST GAS MIXING SYSTEM

(75) Inventors: Eduardo O. De Almeida, Stamford (GB); Tim Eynon, Carms (GB); James D. Wotherspoon, Lincolnshire (GB); Robert C. Wilkie, Peterborough (GB); Timothy D. Chambers, Northamptonshire (GB)

(73) Assignee: Perkins Engines Company Limited, Peterborough (GB)

( * ) Notice: Subject to any disclaimer, the term of this patent is extended or adjusted under 35 U.S.C. 154(b) by 886 days.

(21) Appl. No.: 12/997,164

(22) PCT Filed: Jun. 4, 2009

(86) PCT No.: PCT/EP2009/004004
§ 371 (c)(1),
(2), (4) Date: Dec. 1, 2011

(87) PCT Pub. No.: WO2009/149868
PCT Pub. Date: Dec. 17, 2009

(65) Prior Publication Data
US 2012/0090581 A1    Apr. 19, 2012

(30) Foreign Application Priority Data
Jun. 12, 2008 (EP) .................................. 08158166
Jun. 12, 2008 (EP) .................................. 08158172

(51) Int. Cl.
*F02M 25/07* (2006.01)
*F02M 25/06* (2006.01)

(52) U.S. Cl.
CPC .......... *F02M 25/0722* (2013.01); *Y02T 10/121* (2013.01)
USPC ...................... 123/568.15; 123/590; 701/108

(58) Field of Classification Search
USPC ............. 123/568.11, 568.15, 568.17, 568.18, 123/590, 593; 701/108
See application file for complete search history.

(56) References Cited

U.S. PATENT DOCUMENTS

| | | | |
|---|---|---|---|
| 1,541,583 A | 6/1925 | Merz | |
| 1,766,676 A | 6/1930 | Moore | |
| 3,866,586 A | 2/1975 | Scott, Jr. | |
| 3,989,018 A | 11/1976 | Beier | |
| 4,135,481 A * | 1/1979 | Resler, Jr. | ..................... 123/430 |
| 4,445,487 A | 5/1984 | Higashi | |
| 4,469,498 A | 9/1984 | Fish | |
| 4,545,331 A | 10/1985 | Ito et al. | |
| 4,656,987 A | 4/1987 | Arpaia | |
| 5,121,734 A * | 6/1992 | Grieshaber et al. | ...... 123/568.17 |
| 5,207,714 A | 5/1993 | Hayashi et al. | |

(Continued)

FOREIGN PATENT DOCUMENTS

| | | |
|---|---|---|
| DE | 19937781 | 2/2001 |
| DE | 20023818 | 6/2006 |

(Continued)

*Primary Examiner* — Mahmoud Gimie

(57) ABSTRACT

In one aspect a mixing tube is provided for the introduction of a flow of exhaust gas into a flow of intake air of an internal combustion engine. The mixing tube comprises an opening, tube section, and a plurality of tube ports. The opening is configured to receive the flow of exhaust gas. The tube section is fluidly connected to the opening and extends into the flow of intake air. The tube ports on the tube section are located in low static pressure regions that are determined as intake air passes around the tube section.

15 Claims, 7 Drawing Sheets

(56) References Cited

U.S. PATENT DOCUMENTS

| | | | |
|---|---|---|---|
| 5,356,213 A | 10/1994 | Arpentinier | |
| 5,937,834 A * | 8/1999 | Oto | 123/568.18 |
| 6,138,651 A | 10/2000 | Mori et al. | |
| 6,427,671 B1 | 8/2002 | Holze et al. | |
| 6,451,078 B2 | 9/2002 | Berfield et al. | |
| 6,959,700 B2 | 11/2005 | Wu et al. | |
| 7,128,039 B2 | 10/2006 | Cooper | |
| 7,389,770 B2 | 6/2008 | Bertilsson et al. | |
| 2002/0023619 A1 * | 2/2002 | Janak et al. | 123/321 |
| 2003/0115871 A1 | 6/2003 | Feucht et al. | |
| 2006/0060173 A1 | 3/2006 | Wei et al. | |
| 2008/0011279 A1 * | 1/2008 | Matsumoto | 123/568.11 |
| 2008/0264060 A1 | 10/2008 | Carlsson et al. | |

FOREIGN PATENT DOCUMENTS

| | | |
|---|---|---|
| EP | 1533512 | 5/2005 |
| JP | 05256217 | 10/1993 |
| JP | 09-042069 A | 2/1997 |
| JP | 11-294266 A | 10/1999 |
| JP | 2006-152843 | 6/2006 |
| JP | 2006152843 | 6/2006 |
| WO | 02/070888 | 9/2002 |
| WO | 2006129371 | 12/2006 |

\* cited by examiner

EXHAUST GAS MIXING SYSTEM

RELATED APPLICATIONS

The present disclosure claims the right to priority based on European Patent Application No. EP 08158172.0 filed Jun. 12, 2008, and European Patent Application No. EP 08158166.2 also filed Jun. 12, 2008, both of which are expressly incorporated herein by reference in their entirety.

TECHNICAL FIELD

The disclosure relates to an exhaust gas mixing system, more particular to an exhaust gas mixing system for an exhaust gas recirculation system of an internal combustion engine.

BACKGROUND

An exhaust gas recirculation (EGR) system is a technique commonly used for controlling the generation of undesirable pollutant gases and particulate matter in the operation of internal combustion engines. The EGR system removes exhaust gas and reintroduces it to a flow of intake air. In many EGR systems, the recirculated exhaust gas is reintroduced to the intake manifold. EP-A-0 869 275/U.S. Pat. No. 5,802,846 relates to such an EGR-system.

Exhaust gas mixing systems introduce and mix recirculated exhaust gas with the flow of intake air. The performance, size, packaging, and number of non-integrated components of current exhaust gas mixing systems is not desired. The present disclosure is directed, at least in part, to improving or overcoming one or more aspects of prior exhaust gas mixing systems.

SUMMARY OF THE DISCLOSURE

In one aspect a mixing tube is provided for the introduction of a flow of exhaust gas into a flow of intake air of an internal combustion engine. The mixing tube comprises an opening, a tube section, and a plurality of tube ports. The opening is configured to receive the flow of exhaust gas. The tube section is fluidly connected to the opening and extends into the flow of intake air. The tube ports on the tube section are located in low static pressure regions that are determined as intake air passes around the tube section.

In another aspect, a mixing assembly is provided. The mixing assembly introduces the flow of exhaust gas into the flow of intake air and includes two or more mixing tubes entering the flow of intake air.

In yet another aspect a module mountable as a single unit is provided. The module includes an exhaust introduction body, throttle valve body, and a mixing body. The exhaust introduction body is configured to receive the flow of exhaust gas. The throttle valve body is configured to receive the flow of intake air. The mixing body is fluidly coupled to the exhaust introduction body and the throttle valve body and configured to introduce the flow of exhaust gas into the flow of intake air.

DETAILED DESCRIPTION

Figure 1:
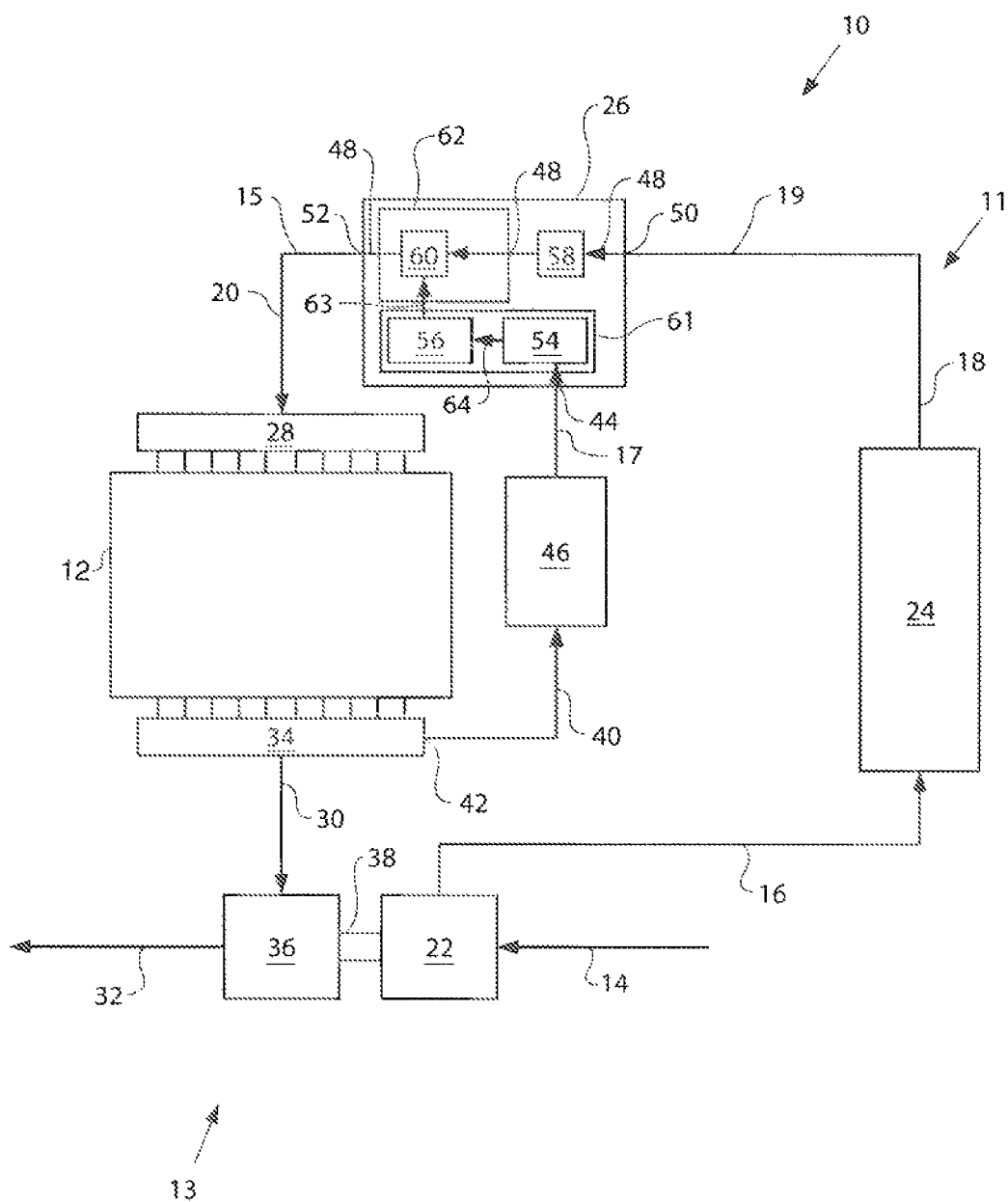
FIG. 1 is a schematic view of an internal combustion engine with an EGR-system.

FIG. 1 schematically shows an internal combustion engine 10 having an engine block 12. The internal combustion engine 10 may have an air intake system 11 and an exhaust system 13 including Exhaust Gas Recirculation (EGR). The air intake system 11 may include air intake passages 14, 16, 18, and 20. The air intake system 11 may also include a compressor 22, a charge air cooler 24, an EGR system or module 26 and an intake manifold 28. Air intake passage 14 delivers fresh air to the compressor 22. Air intake passage 16 delivers air from the compressor 22 to the charge air cooler 24. Air intake passage 18 delivers air from the charge air cooler 24 to the EGR module 26. The air intake passage 20 may be included to deliver a flow of mixed air 15 from the EGR module 26 to the intake manifold 28, or the EGR module 26 may be directly connected to the intake manifold 28. The air intake system 11 may include various additional components. The air intake system 11 may also not include air cooler 24 or compressor 22.

The exhaust system 13 may include exhaust passages 30 and 32. The exhaust system 13 may also include an exhaust manifold 34 and a turbine 36. The compressor 22 may be connected to the turbine 36 via a turbocharger shaft 38. In another embodiment the compressor 22 may also be driven by another element, for example, a shaft that is driven by an electric motor or by the internal combustion engine 10 via a transmission. In such a case the turbine 36 may not be present. The exhaust system 13 may also include various additional components, for example, an exhaust after-treatment system. The exhaust after-treatment system may, for example, include a diesel particulate filter, a diesel oxygen catalyst. and a selective catalytic reduction (SCR) system.

The air intake system 11 may also includes an EGR passage 40 delivering exhaust from the exhaust system 13 to the EGR module 26. An inlet 42 of the EGR passage 40 may emanate from the exhaust manifold 34. An outlet of the EGR passage 40 may emanate in an exhaust gas intake opening 44 of the EGR module 26. The EGR passage 40 may also include an EGR-cooler 46.

The EGR module 26 may be mountable as a single unit in the air intake system 11 between air intake passages 18 and 20. The EGR module 26 includes an air intake channel 48. The air intake channel 48 includes an air intake opening 50 and a mixture outlet opening 52. The air intake opening 50 is connectable to air intake passage 18. The mixture outlet opening 52 is connectable to the air intake passage 20. As stated before, the EGR module 26 also includes the exhaust gas intake opening 44 that is connectable to an outlet of the EGR passage 40.

The EGR module 26 further may also include an exhaust introduction body 61, throttle valve body 58, and a mixing body 62. The exhaust introduction body 61 may include an EGR valve 54 that may control or restrict the amount of exhaust gas that may be recirculated. The EGR module 26 may also include at least one non-return valve 56 that prevents any intake air and exhaust gas from flowing back into the EGR passage 40. The EGR valve 54 and the non-return valves 56 may be in an exhaust gas upstream passage 64 in the EGR module 26. Between the mixing assembly 60 and the non-return valves 56 may be an exhaust gas downstream passage 63. The air intake channel 48 of the EGR module 26 may include the throttle valve body 58 for controlling or restricting the amount or flow of intake air 19 that is passing through the air intake channel 48 and is delivered to the downstream air intake passage 20 of the air intake system 11. Other embodiments of the EGR module 26 do not include the throttle valve body 58.

The mixing body 62 includes a mixer or mixing assembly 60 that may be configured for mixing the flow of exhaust gas 17 introduced in the exhaust gas intake opening 44 and the flow of intake air 19 introduced in the air intake channel 48 via the air intake opening 50. The mixing assembly 60 may be downstream of the non-return valves 56 and the exhaust gas downstream passage 63 of the EGR module 26.

FIGS. 2-6 show three embodiments of the EGR module 26. The first embodiment's components are identified with 100 series part names, the second embodiment's components are identified with 200 series part names, and the third embodiment's components are identified with 300 series part names. The first embodiment 126 is described below in detail. The discussion that follows centers on unique aspects of each of the three embodiments 126, 226, and 326.

Figure 2:
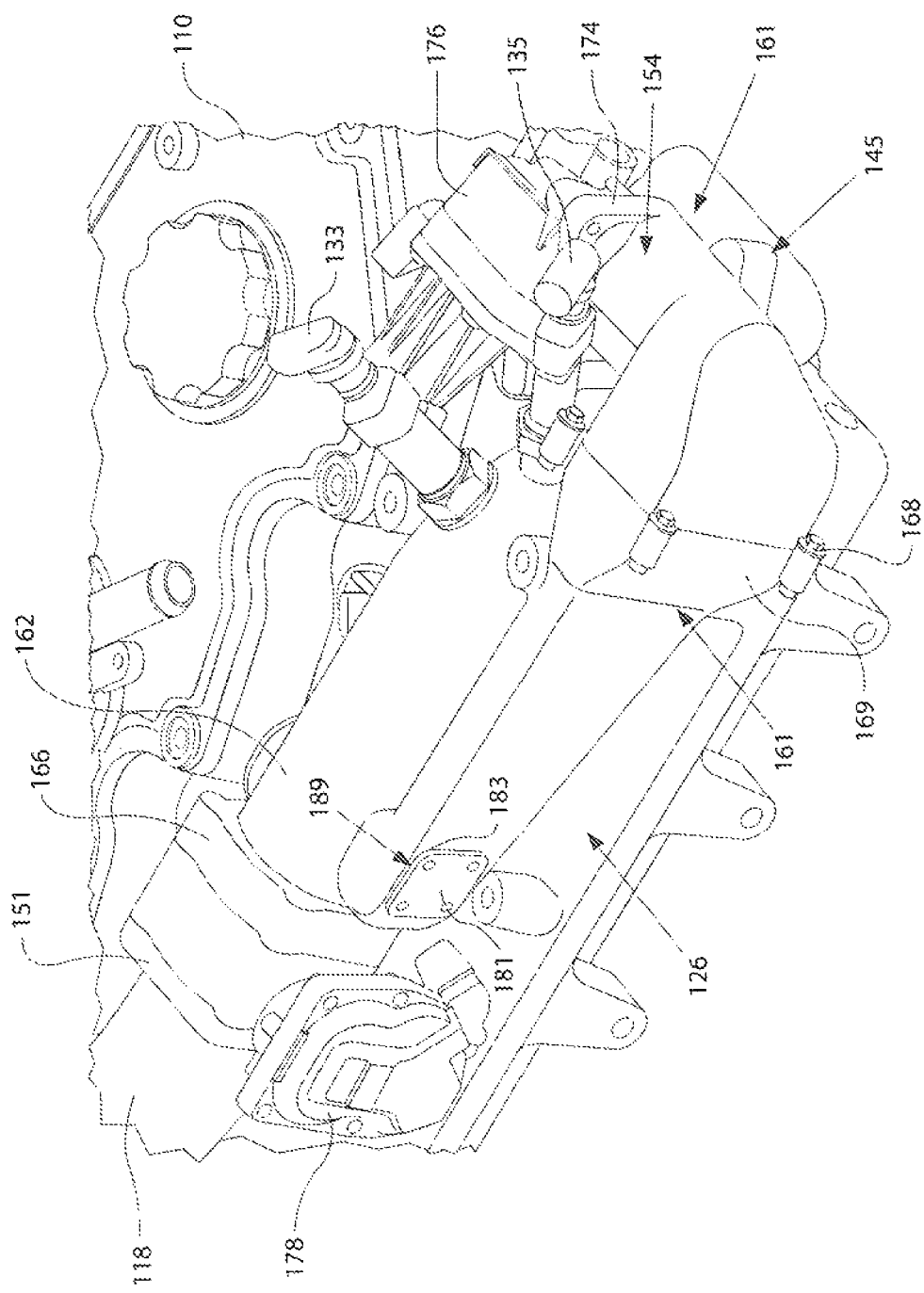
FIG. 2 is a perspective view of a first exemplary embodiment of an EGR module.
Figure 3:
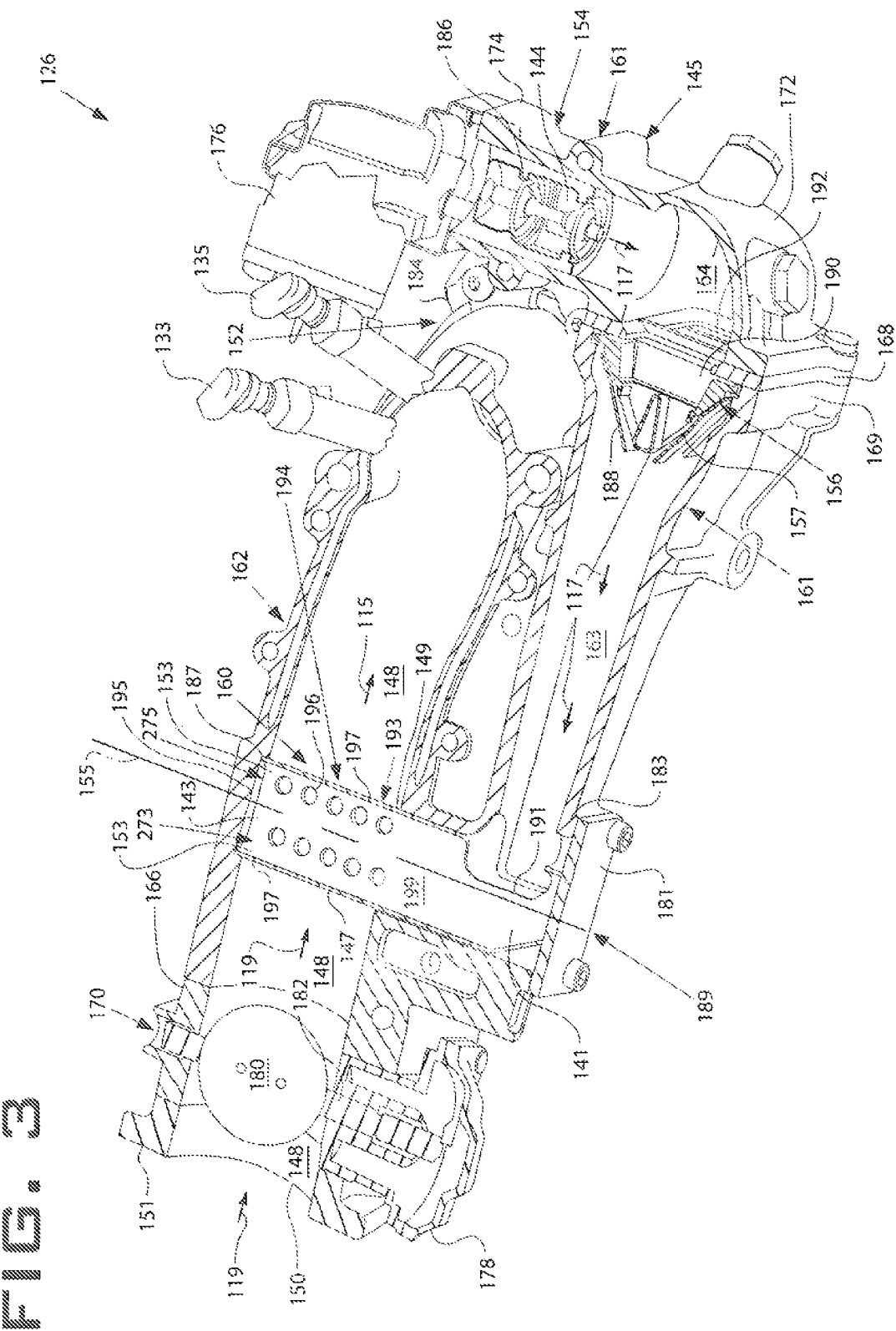
FIG. 3 is a perspective transverse cross-section of the first exemplary embodiment of an EGR module of FIG. 1.
Figure 4:
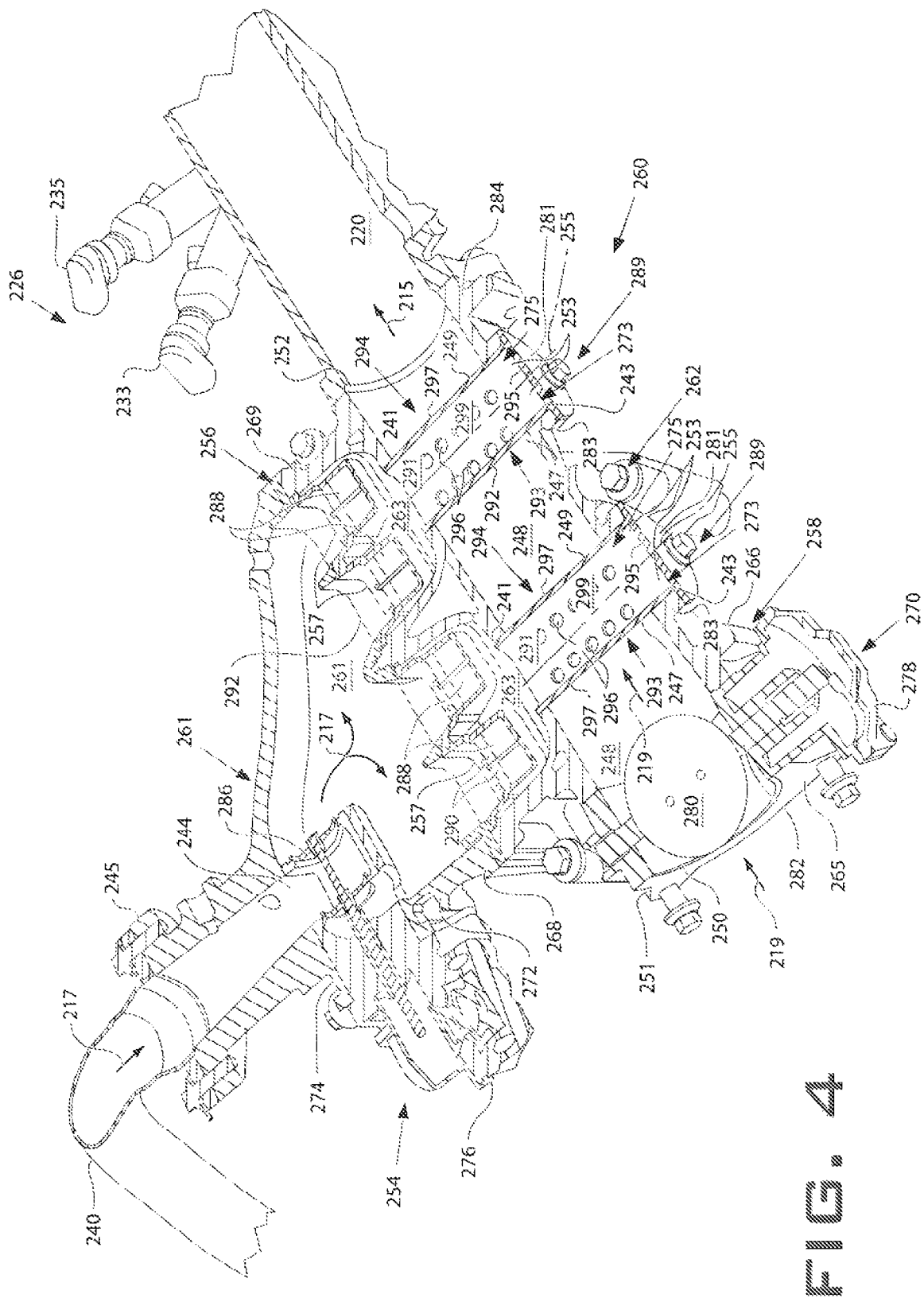
FIG. 4 is a perspective transverse cross-section of a second exemplary embodiment of an EGR module.
Figure 5:
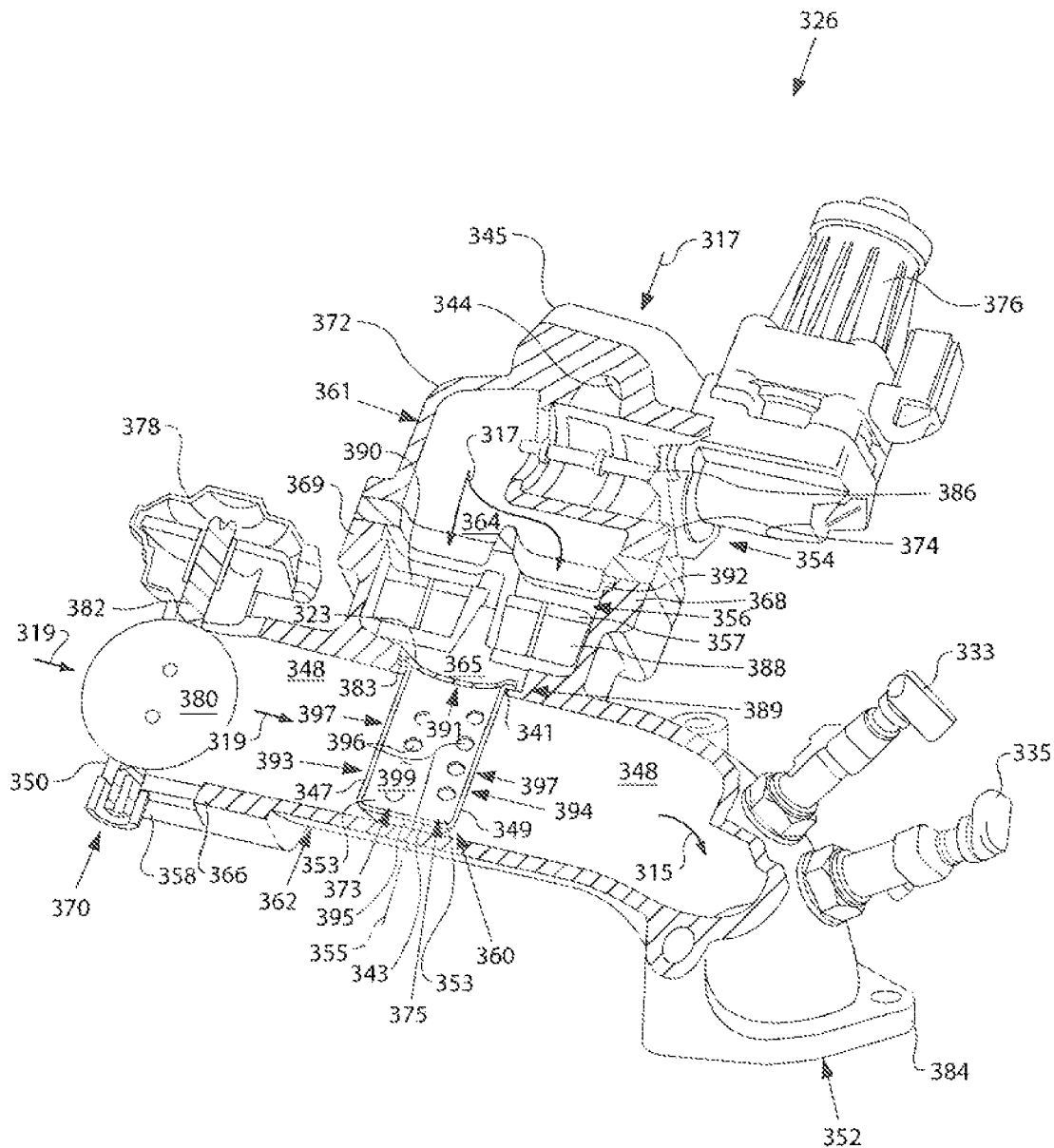
FIG. 5 is a perspective transverse cross-section of a third exemplary embodiment of an EGR module.
Figure 6:
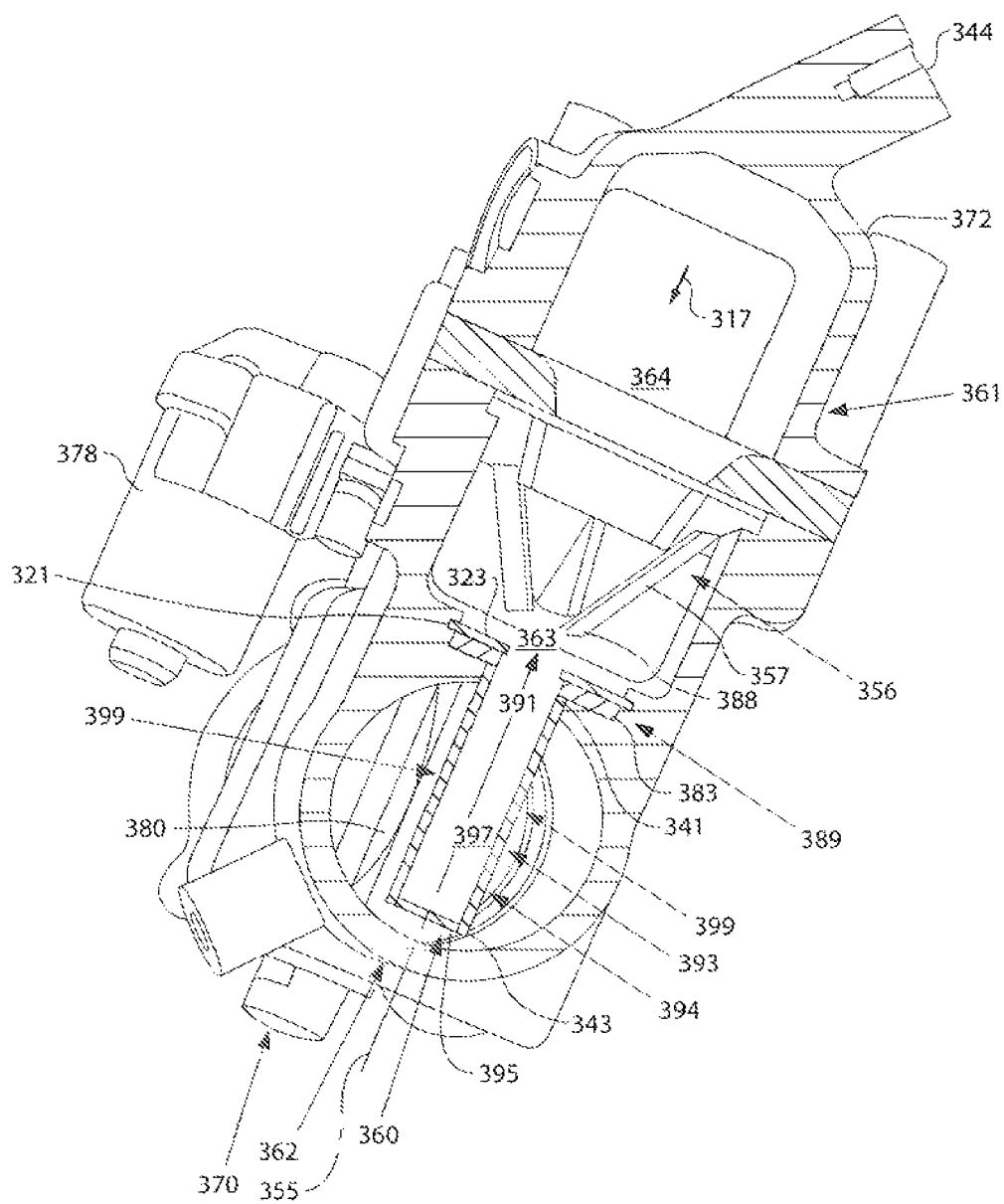
FIG. 6 is a perspective longitudinal cross-section of the third embodiment of a mixing assembly of FIG. 5.

FIGS. 2 and 3 show a first embodiment 126 of the EGR module 26. The EGR module 126 is shown in FIG. 2 mounted onto engine 110. The EGR module 126 includes an exhaust introduction body 161, throttle valve body 158, and mixing body 162.

The exhaust introduction body 161 defines an exhaust gas downstream passage 163 and an exhaust gas upstream passage 164. The exhaust introduction body 161 includes a non-return valve housing 169 and EGR valve housing 172. The non-return valve housing 169 contains the non-return valves 156 and includes an EGR valve housing flange 168. The flow of exhaust gas 117 taken in by EGR module 126 passes through the non-return valves 156. The non-return valve 156 resists the flowing back of a flow of exhaust gas 117 when a flow of intake air 119 pressure is higher than the flow of exhaust gas 117 pressure adjacent the non-return valve 156.

In one embodiment, the non-return valves 156 may have the form of at least one reed valve 157. The at least one reed valve 157 may include a reed valve body 190 with a reed valve flange 192 in the non-return valve housing 169. Thus, the non-return valves 156 are clamped in between the exhaust gas downstream passage 163 and exhaust gas upstream passage 164. The reed valves 157 may also include membranes 188 that are connected with one end to the reed valve body 190. The reed valve membranes 188 may flex when the pressure upstream of the reed valve 157 is higher then the pressure downstream of the reed valve 157. Such a flexing opens the reed valve 157. Because the membranes 188 are light and flex easily, reed valves 157 have a very short response time and even small pressure differences are sufficient for opening and closing the reed valves 157 and capturing pulses of exhaust gas. Thus, the amount of exhaust gas that may be recirculated may be optimal. Two sets reed valves 157 are used in the current embodiment, however, it is contemplated that a different number of reed valves 157 can be used. The number may depend on the amount of exhaust gas that may be recirculated and size of the reed valves 157. Other types and mounting of the non-return valves 156 are feasible.

The EGR valve housing 172 houses an EGR valve 154 and is connected to the EGR valve housing flange 168. The EGR valve housing 172 may have a motor flange 174. An EGR valve motor 176 may be connected to the motor flange 174 of the EGR valve housing 172. The EGR valve housing 172 may also include an EGR valve member 186 driven by the EGR valve motor 176 for regulating the amount of exhaust gas that may pass the EGR module 126. The EGR valve housing 172 also includes an exhaust gas intake opening 144 that may be surrounded by an EGR passage connecting flange 145 and is upstream of the exhaust gas upstream passage 164.

The throttle valve body 158 includes a throttle valve 170 fluidly connected to an air intake passage 118. The throttle valve body 58 also partly defines an air intake channel 148. The throttle valve 170 includes a throttle valve motor 178, valve flap 180, and valve shaft 182.

The valve shaft 182 is driven by the throttle valve motor 178. The valve shaft 182 of the throttle valve 170 has a longitudinal axis that may be substantially parallel to the central axis 155 of the at least one mixing tube 194. The valve flap 180 is coupled to the valve shaft 182 for regulating the position of the valve flap 180 relative to the air intake channel 148. The valve shaft 182 may extend substantially perpendicular or transverse to a central axis of the air intake channel 148 at that position. This may be effected directly or via a transmission. Other types of throttle valves 170 are feasible as well. The throttle valve body 158 also includes an air intake opening 150 that may be surrounded by an air intake flange 151.

The mixing body 162 also partly defines the air intake channel 148 and includes a mixing assembly 160. The mixing body 162 also includes a throttle valve body flange 166 and an outlet flange 184 adjacent a mixture outlet opening 152. The throttle valve body flange 166 couples the mixing body 162 to the throttle valve body 158. With the outlet flange 184, the EGR module 126 is fluidly coupled with air intake passage 20 or intake manifold 28.

The mixing body 162 is configured to receive the flow of exhaust gas 117 from the downstream passage 163 of the exhaust introduction body 161 and introduce the flow of exhaust gas 117 into the air intake channel 148. The air intake channel 148 has a central axis that extends substantially parallel to the flow of intake air 119 in the air intake channel 148.

The mixing assembly 160 includes a mixing tube 194 and a mixing tube mount 189. The mixing tube 194 includes a tube opening 191, tube section 193, end wall 195, and tube ports 196. The tube opening 191 opens into the downstream passage 163 and the tube ports 196 open into the air intake channel 148.

The tube section 193 includes a tube first end 141, tube second end 143, frontal surface 147, trailing surface 149, opposing short wall segments 197, opposing long wall segments 199, and corner segments 153. The tube section 193 and mixing tube 194 are elongated with a central axis 155 substantially perpendicular or transverse to the flow of intake air 119 and the air intake passage 148 extending from the tube first end 141 to the tube second end 143.

The tube first end 141 is proximate the downstream passage 163 at the top of the tube section 193. The tube opening 191 may be proximate the tube first end 193. The tube second end 143 is at the bottom of the tube section 193, at the opposite end as the tube first end 141.

The frontal surface 147 and trailing surface 149 run along the length of the tube section 193 substantially parallel to the central axis 155. The frontal surface 147 is facing the oncoming flow of intake air 119. The trailing surface 149 is on the opposite end of the tube section 193 as the frontal surface 147. The frontal surface 147 may be relatively small to prevent a restriction of the flow of intake air 119.

The tube section 193 may be oval, elliptical, or rectangular with rounded corners in cross-section. The short wall segments 197, long wall segments 199, and corner segments 153 extend the length of the tube section 193 parallel to the central axis 155. The short wall segments 197 are shorter than the long wall segments 199 in a direction substantially perpendicular or transverse to the central axis 155 of the mixing tube 194. The opposing short wall segments 197 may form the frontal surface 147 and trailing surface 149. The long wall segments 199 may extend in a direction substantially parallel to the flow of intake air 119 in the air intake channel 148 and in a direction substantially perpendicular or transverse to the central axis 155 of the mixing tube 194. The corner segments 153 represent the corners of the tube section 193 and form the transition between the short wall segments 197 and long wall segments 199.

The end wall 195 may be included to close off the tube section 193 at the second end 143. The end wall 195 may be formed as part of the mixing tube 194 or the mixing tube 194 may extend to a wall of the mixing body 162 to form the end wall 195. The mixing body 162 may also include a recessed portion 187 to receive the mixing tube 194 and aid in the formation of the end wall 195.

The plurality of tube ports 196 are included as openings, holes, or orifices in the tube section 193. The tube ports 196 may be circular (as shown), oval, slots, or any other shaped hole. The tube ports 196 may be located in rows 173 and 175 extending substantially parallel to the central axis 155 of the tube section 193. The tube ports 196 may be located in upstream rows 173 and downstream rows 175. The tube ports 196 on the upstream rows 173 are directly upstream of the flow of intake air 111 from the downstream rows 175. The tube ports 196 on the upstream row 173 may be offset from the row of tube ports 196 on the downstream row 175 so that the tube ports 196 do not overlap a straight line flow of intake air 119. The offset of tube ports 96 promotes mixture of the flow of exhaust gas 197 into the flow of intake air 119 by helping expose a greater area of the flow of intake air 119 to the flow of exhaust gas 117. The location of the tube ports 196 are discussed in more detail with reference to FIG. 7 below.

The mixing tube mount 189 includes a mount plate 181 and a tube mount flange 183. The mount plate 181 is coupled to the mixing tube 194. The mount flange 183 is formed in the outside of EGR module 126. Locating the tube mount 189 outside the EGR module 126 reduces the chances of debris, like loosened fasteners, from falling into the air intake channel 148 and damaging the engine and also aids in assembly. Other mounting systems are also feasible.

A flow of exhaust gas 117 passing through the exhaust introduction body 161 and out the mixing assembly 160 mixes with the flow of intake air 119 to form a flow of mixed air 115 in the air intake channel 148.

The EGR module 126 may also include various sensors. For example a temperature sensor 133 and a pressure sensor 135. Those sensors may be positioned in the flow of mixed air 115 near the mixture outlet opening 152. More than one temperature sensor 133 and more than one pressure sensor 135 may be present. Also other sensors, for example, sensors for measuring the concentration of constituents of the mixture may be present. A controller may also be included and electrically connected to the EGR valve motor 176 and throttle valve motor 178 to control and power them. The control may be based on signals from the temperature sensor 133 and a pressure sensor 135 and many other signals from the engine 110.

The configuration of the EGR module 126 varies from the other embodiments 226 and 326 in several aspects. The exhaust gas downstream passage 163 is elongated and runs substantially perpendicular or transverse to the exhaust gas upstream section 164. The exhaust gas upstream passage 163 also runs substantially parallel to the air intake channel 148 and substantially perpendicular transverse to the central axis 155 of the mixing tube 194. The tube opening 191 is formed in the side of the tube section 193 of the mixing tube 194 such that the flow of exhaust gas 117 passes through the exhaust gas downstream passage 163 and turns substantially 90 degrees after entering the mixing tube 194.

The mount flange 183 is coupled to the outside of the exhaust introduction body 161 proximate the end of the exhaust gas downstream passage 163 and proximate the first end 141 and tube opening 191. The EGR valve 154 is located proximate the mixture outlet opening 152 beyond the end of the air intake channel 148.

The configuration of the EGR module 226 varies from the other embodiments 126 and 326 as follows. The mixing assembly 260 includes two mixing tubes 294 and two sets of non-return valves 256. One of the mixing tubes 294 is upstream in the flow of intake air 211 from the other mixing tube 194. The two mixing tubes 294 smooth pulses in the flow of exhaust gas 217 from the engine 10. The engine 10 creates pulses and not a smooth flow of exhaust. Having mixing tubes 294 spatially separated in the air intake passages 248 averages the pulses to create a smoother flow of mixed air 215. The two mixing tubes 294 also allows for the introduction of larger flows of exhaust gas 217.

The second embodiment 226 also has a different, and in many aspects opposite, flow path compared to the first embodiment 126. The EGR module 226 involves a shorter exhaust gas downstream passage 263 that is substantially parallel to the exhaust gas upstream section 264. The exhaust gas upstream passage 264 also runs substantially perpendicular or transverse to the air intake passage 248 and substantially parallel to the central axis 255 of the mixing tube 294. The tube opening 291 is formed in the top of the tube section 293 of the mixing tube 294 such that the flow of exhaust 217 passes through the exhaust gas downstream passage 263 directly into the mixing tube 294.

The mixing tube mount 289 is also different. The mount plate 281 is at the tube second end 243 and a tube mount flange 283 is at the opposite end of the air intake channel 248 as the tube opening 291.

The third embodiment 326 also includes unique aspects. The mixing tube mount 389 of the third embodiment does not include a mount plate. As seen best in FIG. 6, the mixing tube mount 389 includes a tube mount flange 383. The tube mount flange 383 is adjacent the tube first end 341. The mixing tube mount 389 also includes a circlip groove 321 above the tube mount flange 383. A circlip 323 is inserted in the circlip groove 321 to hold the mixing tube 394 in place. The circlip 323 is a flexible ring member with an interruption in the ring member, the interruption being bounded by two ends of the ring. The circumference of the circlip 323 ring member may be diminished by flexing the ends of the ring adjacent the interruption towards each other. Thus the circlip 323 may be snapped into the circlip groove 321.

Figure 7:
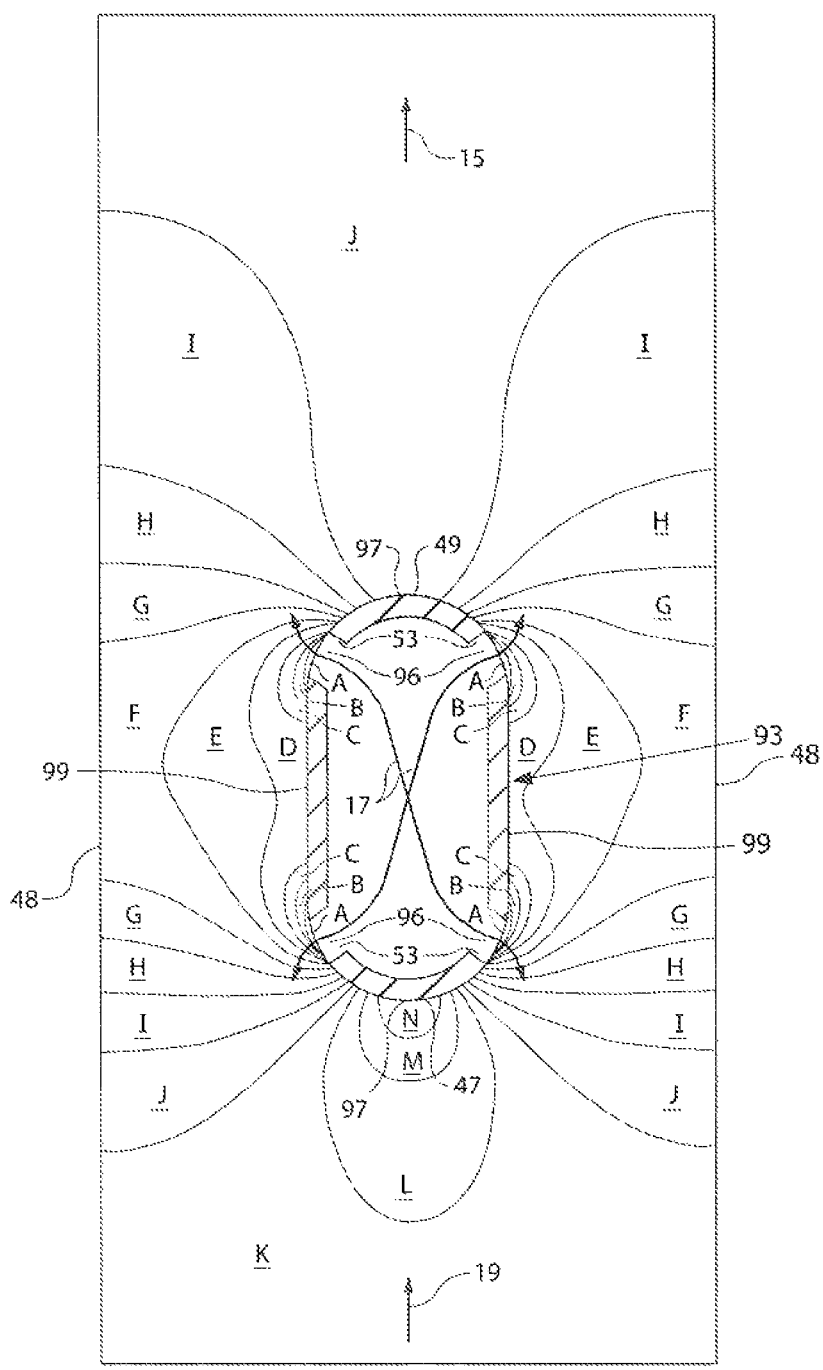
FIG. 7 is a top view of a mixing tube illustrating pressure regions as gasses flow past.

FIG. 7 shows a cross-sectional top view of the tube section 93 in the air intake channel 48. The flow of intake air 19 passes through the air intake channel 48 and passes transverse to and around the tube section 93 creating low static pressure regions. The flow of intake air 19 first makes contact with the frontal edge 47. The flow of exhaust gas 17 passes through an interior of the tube section 93 and out the tube ports 96. The flow of exhaust gas 17 mixes with the flow of intake air 19 to form the flow of mixed air 15 passing beyond the trailing edge 49.

FIG. 7 also shows static pressure regions A through M around the exterior of the tube section 93 that result from this flow of air around the tube section 93. These pressure regions were determined through computer modeling, experimentation, and testing. Pressure region A has the lowest pressure and pressure region M has the highest, with a corresponding progression of values between A and M.

The flow of intake air 19 accelerates as it passes over the frontal edge 47 and slows as it passes beyond the trailing edge 49. These changes in speed create static pressure regions A through M. The tube ports 96 are located in low pressure regions. Locating the tube ports 96 in area of low pressure in the tube section 93 encourages the introduction of the flow of exhaust gas 17 into the flow of intake air 19 and the formation of the flow of mixed air 15. The flow of exhaust gas 17 is more easily drawn out of the tube section 93 at regions of low pressure. In the current embodiment and according to the current data, the lowest pressure region is located proximate the corner segments 53 proximate to region A. Accordingly, the tube ports 96 are formed as openings in the corner segments 53. The tube ports may also extend onto the long segments 99 or short segments 97.

INDUSTRIAL APPLICABILITY

The EGR module 26, 126, 226, and 326 as described may be applied in any internal combustion engine 10. Because the EGR module 26 may be compact, packaging of the EGR module 26 in a limited space around the engine 10 may be desirable. The location of tube ports 96 promote the introduction and mixing of the flow of exhaust gas 17.

The EGR module 26 may be configured to be supplied by an external supplier as a single unit. Consequently, the assembling effort for incorporating such the EGR module 26 on an internal combustion engine 10 may be reduced. Because the components of EGR module 26 are integrated and configured as a single unit, all these parts may be serviced simultaneously and may be kept in stock as a single unit. From a servicing point of view and from a logistic point of view that may be advantageous.

It will be apparent to those having ordinary skill in the art that various modifications and variations can be made to the Exhaust Gas Mixing System as disclosed herein. Other embodiments will be apparent to those having ordinary skill in the art from consideration of the specification. It is intended that the specification and examples are considered as exemplary only. Other aspects, features and advantages will be apparent upon an examination of the attached drawings and appended claims.

What is claimed is:

1. An internal combustion engine comprising:
   an intake system with an intake passage fluidly connected to an intake manifold;
   an exhaust system fluidly connected to an exhaust manifold;
   an exhaust gas recirculation passage fluidly connecting the exhaust manifold to the intake passage;
   a mixing tube that is located entirely in the intake passage with a central axis oriented perpendicular to a flow direction through the intake passage, the mixing tube comprising a wall extending between a first end of the mixing tube and a second end of the mixing tube, wherein the mixing tube comprises:
      a first plurality of tube ports being provided in the wall and being located upstream from the central axis; and
      a second plurality of tube ports being provided in the wall and being located downstream from the central axis.

2. The engine of claim 1, further comprising an exhaust gas recirculation valve positioned in the exhaust gas recirculation passage.

3. The engine of claim 1, further comprising a non-return valve positioned in the exhaust gas recirculation passage.

4. The engine of claim 1, wherein the first plurality of tube ports are arranged in a first row parallel to the central axis; and
   the second plurality of tube ports are arranged in a second row parallel to the central axis.

5. The engine of claim 1, wherein the mixing tube has a cross sectional shape with long wall segments joined to short wall segments by rounded corners; and
   the tube ports are located at the rounded corners.

6. The engine of claim 5, wherein the long wall segments extend perpendicular to the central axis and parallel to the flow direction through the intake passage.

7. The engine of claim 4, wherein the first plurality of tube ports in the first row are offset with respect to the second plurality of tube ports in the second TOW.

8. The engine of claim 1, further comprising:
   a second mixing tube with a central axis oriented perpendicular to the flow direction through, and being positioned in, the intake passage.

9. An internal combustion engine comprising:
   an intake system with an intake passage fluidly connected to an intake manifold;
   an exhaust system fluidly connected to an exhaust manifold;
   an exhaust gas recirculation passage fluidly connecting the exhaust manifold to the intake passage;
   a mixing tube that is located entirely in the intake passage with a central axis oriented perpendicular to a flow direction through the intake passage, the mixing tube comprising a wall extending between a first end of the mixing tube and a second end of the mixing tube, wherein the mixing tube comprises:
      a first plurality of tube ports being located upstream from the central axis in the intake passage;
      a second plurality of tube ports being located downstream from the central axis;
   wherein the mixing tube has a cross sectional shape with long wall segments joined to short wall segments by rounded corners; and
   the tube ports are located at the rounded corners.

10. The engine of claim 9, further comprising an exhaust gas recirculation valve positioned in the exhaust gas recirculation passage.

11. The engine of claim 9, further comprising a non-return valve positioned in the exhaust gas recirculation passage.

12. The engine of claim 9, wherein the first plurality of tube ports are arranged in a first row parallel to the central axis; and
   the second plurality of tube ports are arranged in a second row parallel to the central axis.

13. The engine of claim 9, wherein the long wall segments extend perpendicular to the central axis and parallel to the flow direction through the intake passage.

14. The engine of claim 12, wherein the first plurality of tube ports in the first row are offset with respect to the second plurality of tube ports in the second TOW.

15. The engine of claim 9, further comprising:
   a second mixing tube with a central axis oriented perpendicular to the flow direction through, and being positioned in, the intake passage.

* * * * *